US011466728B2

United States Patent
Saxton

(10) Patent No.: US 11,466,728 B2
(45) Date of Patent: Oct. 11, 2022

(54) BEARING AND METHOD OF MANUFACTURING PERMITTING HIGH TEMPERATURE HEAT TREATMENT

(71) Applicant: Federal-Mogul LLC, Southfield, MI (US)

(72) Inventor: David M. Saxton, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 15/927,461

(22) Filed: Mar. 21, 2018

(65) Prior Publication Data
US 2019/0293114 A1    Sep. 26, 2019

(51) Int. Cl.
*B23K 20/00*    (2006.01)
*B23K 20/26*    (2006.01)
(Continued)

(52) U.S. Cl.
CPC ............ *F16C 17/02* (2013.01); *B23K 20/002* (2013.01); *B23K 20/26* (2013.01); *F16C 33/121* (2013.01); *F16C 33/127* (2013.01); *F16C 33/14* (2013.01); *B23K 2103/04* (2018.08); *B23K 2103/10* (2018.08); *F16C 17/022* (2013.01); *F16C 17/04* (2013.01); *F16C 2204/20* (2013.01); *F16C 2204/52* (2013.01); *F16C 2204/60* (2013.01); *F16C 2206/60* (2013.01); *F16C 2220/44* (2013.01); *F16C 2223/70* (2013.01);
(Continued)

(58) Field of Classification Search
CPC .... F16C 17/02; F16C 33/121; F16C 2204/20; F16C 2204/52; B23K 20/26; B23K 20/002; B23K 2103/10; B23K 2103/04
See application file for complete search history.

(56) References Cited

U.S. PATENT DOCUMENTS 4,307,921 A * 12/1981 Roberts ................. F16C 17/022
384/399
4,718,155 A    1/1988 Warriner et al.
(Continued)

FOREIGN PATENT DOCUMENTS

JP    11293410 A  * 10/1999

OTHER PUBLICATIONS

"Engine bearing materials", Dr. Dmitri Kopeliovich, SubsTech Substances and Technologies, May 15, 2012, https://www.substech.com/dokuwiki/doku.php?id=engine_bearing_materials (SubsTech) as applied to Claims 1-5 above, and further in view of United States Patent Publication No. U.S. Pat. No. 4,307,921 (Roberts) (Year: 2012).*

*Primary Examiner* — Daniel J. Schleis
*Assistant Examiner* — Kevin Ct Li
(74) *Attorney, Agent, or Firm* — Robert L. Stearns; Dickinson Wright, PLLC

(57) ABSTRACT

A bearing including a backing formed of a steel material, a lining formed of aluminum or an aluminum alloy, and a diffusion barrier layer disposed between the backing and the lining is provided. The diffusion barrier layer is formed of nickel or a nickel alloy and has a thickness ranging from 1 micron to 100 microns. The bearing is typically formed by cladding the lining or plating the steel backing with the diffusion barrier layer, bonding the lining and the backing with the diffusion barrier layer between, heating to a temperature of at least 400° C., and forming the bearing into a shape after or before the heating step.

5 Claims, 1 Drawing Sheet

(51) Int. Cl.
  *F16C 17/20* (2006.01)
  *F16C 33/12* (2006.01)
  *F16C 17/02* (2006.01)
  *F16C 33/14* (2006.01)
  *B23K 103/04* (2006.01)
  *B23K 103/10* (2006.01)
  *F16C 17/04* (2006.01)

(52) U.S. Cl.
  CPC ...... *F16C 2240/06* (2013.01); *F16C 2240/60* (2013.01); *F16C 2326/01* (2013.01)

(56) References Cited

U.S. PATENT DOCUMENTS

| | | |
|---|---|---|
| 5,925,471 A | 7/1999 | Eastham et al. |
| 6,045,929 A | 4/2000 | Eastham et al. |
| 6,146,019 A | 11/2000 | Andler et al. |
| 6,194,087 B1 * | 2/2001 | Huhn .................. C23C 28/021 428/646 |
| 6,221,515 B1 | 4/2001 | Ramos Junior et al. |
| 6,263,575 B1 | 7/2001 | Andler et al. |
| 6,267,508 B1 | 7/2001 | Bank et al. |
| 6,273,972 B1 | 8/2001 | Andler |
| 6,301,784 B1 | 10/2001 | Niegel et al. |
| 6,309,760 B1 | 10/2001 | Lyon et al. |
| 6,451,452 B1 | 9/2002 | Niegel et al. |
| 6,472,086 B2 | 10/2002 | Lyon et al. |
| 6,609,830 B2 | 8/2003 | Bank et al. |
| 7,229,699 B2 * | 6/2007 | Toth .......................... C23C 4/02 29/898.12 |
| 7,368,046 B2 | 5/2008 | Adam et al. |
| 7,575,814 B2 | 8/2009 | Adam et al. |
| 7,942,581 B2 * | 5/2011 | Leonardelli ........... F16C 33/201 384/276 |
| 7,993,758 B2 * | 8/2011 | Wilhelm .................. C22C 9/06 428/626 |
| 2014/0348450 A1 | 11/2014 | Kachoosangi |
| 2014/0353161 A1 | 12/2014 | Kachoosangi et al. |
| 2015/0369287 A1 | 12/2015 | Zhang et al. |

\* cited by examiner

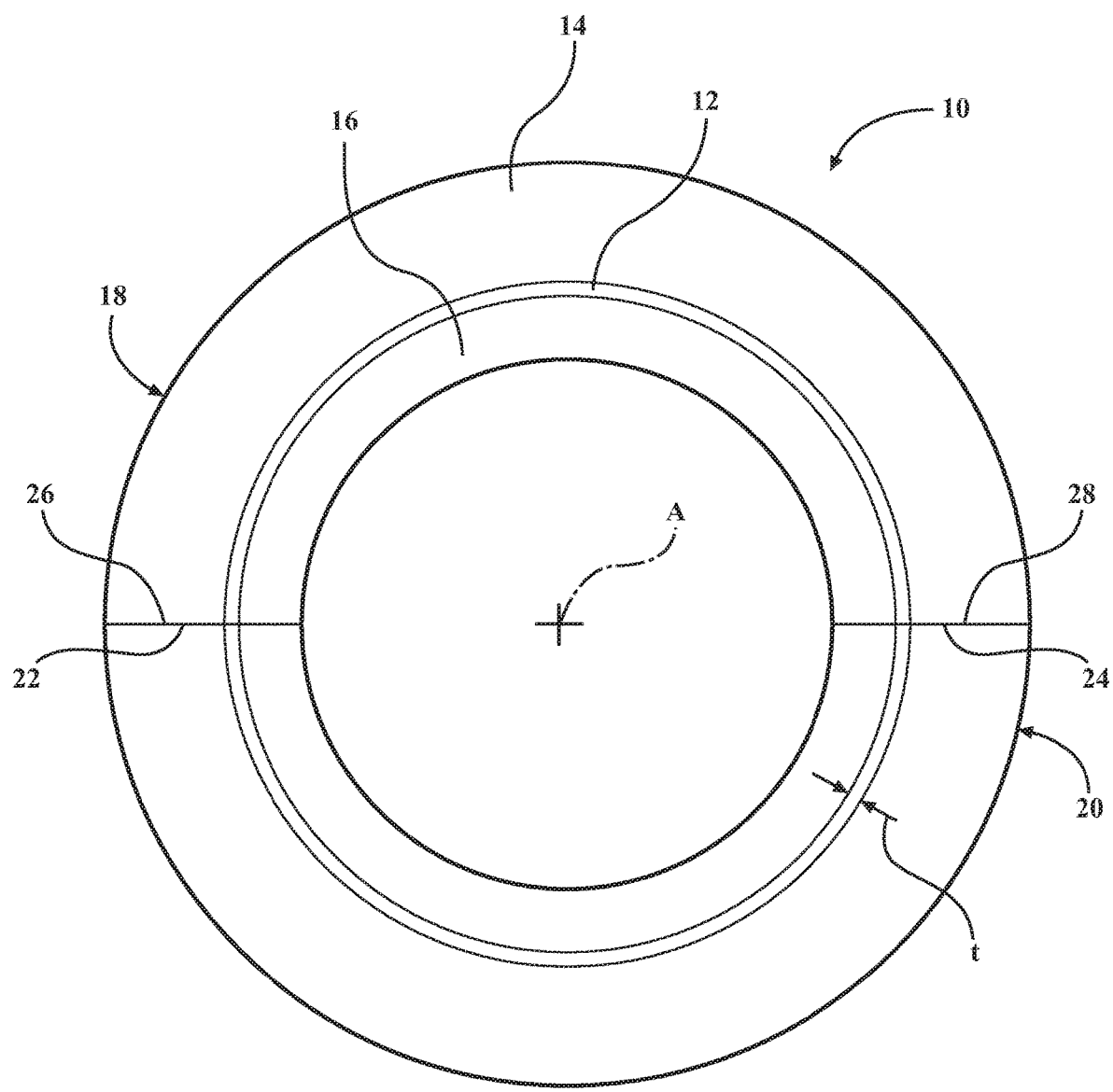

BEARING AND METHOD OF MANUFACTURING PERMITTING HIGH TEMPERATURE HEAT TREATMENT

BACKGROUND

1. Field of the Invention

This invention relates generally to sliding-type bearings, and more particularly to those having a sintered powder metal bronze bearing material applied to a steel backing, such as used in engine bearings.

2. Related Art

Internal combustion engines oftentimes include bearings comprising a lining formed of aluminum bonded to a backing formed of steel. After bonding the aluminum lining to the steel backing, the bearing is heat treated. However, the temperature of the heat treatment process is limited in attempt to prevent brittle intermetallic iron-aluminum phases from forming at the bond line. Certain higher temperature heat treatments are avoided in attempt to prevent formation of the intermetallic iron-aluminum phases.

SUMMARY

One aspect of the invention provides a bearing comprising a backing formed of a steel material, a lining disposed along the backing, and a diffusion barrier layer disposed between the backing and the lining. The lining is formed of aluminum or an aluminum alloy, the diffusion barrier layer is formed of nickel or a nickel alloy, and the diffusion barrier layer has a thickness ranging from 1 micron to 100 microns.

Another aspect of the invention provides a method of manufacturing a bearing. The method comprises the steps of obtaining a bearing including a backing formed of a steel material, a lining formed of aluminum or an aluminum alloy disposed along the backing, and a diffusion barrier layer being formed of nickel or a nickel alloy disposed between the backing and the lining. The method further includes heating the bearing.

Yet another aspect of the invention provides a method of manufacturing a bearing. The method comprises disposing a lining formed of aluminum or an aluminum alloy along a diffusion barrier layer, the diffusion barrier layer being formed of nickel or a nickel alloy and having a thickness ranging from 1 micron to 100 microns; and disposing the diffusion barrier layer along a backing formed of a steel material.

BRIEF DESCRIPTION OF THE DRAWINGS

These and other features and advantages of the present invention will become more readily appreciated when considered in connection with the following detailed description and appended drawing:

FIG. 1 is a side view of an engine bearing constructed according to an example embodiment.

DETAILED DESCRIPTION OF EXAMPLE EMBODIMENTS

One aspect of the invention provides a bearing 10, washer, or bushing for an internal combustion engine. An example of the bearing is shown in FIG. 1. For simplicity, the remainder of the description will be made in reference to the engine bearing, but it is to be understood that the description is equally applicable to the washer or bushing. The bearing includes a diffusion barrier layer 12 formed of nickel or a nickel alloy disposed between a backing 14 formed of a steel material and a lining 16 formed of aluminum or an aluminum alloy. The diffusion barrier layer is able to prevent or reduce undesirable intermetallic iron-aluminum phases when the bearing is heat treated at temperatures of at least 400° C. This high temperature heat treatment may grow silicon particles or form various beneficial precipitates in the lining of the bearing.

The bearing can have various different designs and/or dimensions depending on the particular application for which it is designed. In the example embodiment of FIG. 1, the bearing includes a first half shell 18 and a second half shell 20. The first half shell extends circumferentially around a first portion of a center axis A from a first end 22 to a second end 24. The second half shell extends circumferentially around a second portion of the center axis from a third end 26 to a fourth end 28. The third end of the second half shell is joined to the first end of the first half shell, and the fourth end of the second half shell is joined to the second end of the first half shell. The half shells each include the backing, the diffusion barrier layer, and the lining.

The diffusion barrier layer formed of the nickel or nickel alloy is typically disposed directly on the backing formed of the steel material, and the lining is typically disposed directly on the diffusion barrier layer. The diffusion barrier layer has a thickness t ranging from 1 micron to 100 microns.

The thickness of the diffusion barrier layer is significant. A thickness of less than 1 micron will be insufficiently effective in reducing the formation of iron-aluminum intermetallic during a heating step, while more than 100 microns may have adverse effects on the mechanical properties of the overall bearing product. In addition, alloying and similar modifications to the diffusion barrier layer may be done to enhance these properties, especially with thicker overall diffusion barrier layers.

In the finished bearing product, after a heat treatment of the bearing, the silicon particles are preferably present in the lining. Due to the diffusion barrier layer, the iron-aluminum intermetallic phases are typically not present in the backing layer, the lining, or the diffusion barrier layer. If the aluminum intermetallic phases are present, they are present in an amount which is insufficient to cause brittleness of the diffusion barrier layer, the backing layer, or the lining. Also, if present, the aluminum intermetallic phases are in an amount insufficient to cause failure of the bonds between the backing layer, diffusion barrier layer, and lining. Also, if present, the aluminum intermetallic phases would be in an amount too small to be observed in cross sectional examination at up to 500× magnification.

Another aspect of the invention provides a method of manufacturing the bearing. This method includes obtaining the bearing including the backing formed of the steel material, the lining formed of the aluminum or aluminum alloy disposed along the backing, and the diffusion barrier layer formed of the nickel or a nickel alloy disposed between the backing and the lining. The diffusion barrier layer preferably has a thickness ranging from 1 to 100 microns. These steps can include producing the backing, the lining, and/or the diffusion barrier layer in the form of a strip by various different methods.

The method further includes heating the lining of the bearing, for example heating the bearing to a temperature of at least 400° C. Typically, the heating step is conducted during a heat treatment process after the backing and the lining are bonded to one another with the diffusion barrier layer therebetween. The heating step can include forming the particles including silicon in the lining if silicon is in present as an alloying element in the lining. The diffusion barrier layer prevents or reduces the formation of the iron-aluminum intermetallic phases in the backing, the lining, and the diffusion barrier layer. Due to the diffusion barrier layer, the iron-aluminum intermetallic phases are typically not formed during the heating step. If the aluminum intermetallic phases are formed, they are present in an amount which is insufficient to cause brittleness of the diffusion barrier layer, the backing layer, or the lining. Also, if present, the aluminum intermetallic phases are in an amount insufficient to cause failure of the bonds between the backing layer, diffusion barrier layer, and lining. Also, if present, the aluminum intermetallic phases would be in an amount too small to be observed in cross sectional examination at up to 500× magnification.

Yet another aspect of the invention provides a method of manufacturing the bearing comprising the steps of disposing the diffusion barrier layer along the backing formed of the steel material, the diffusion barrier layer being formed of the nickel or a nickel alloy and having the thickness ranging from 1 micron to 100 microns; and disposing the lining formed of the aluminum or an aluminum alloy along the diffusion barrier layer.

The diffusion barrier layer can be disposed along or applied to the lining and/or the backing using various different techniques. According to one example embodiment, the method includes rolling the diffusion barrier layer onto the lining so that the diffusion barrier layer is clad to the lining prior to disposing the diffusion barrier along the backing, for example roll bonding the lining and clad diffusion barrier layer to the backing. Alternatively, the method can include plating the diffusion barrier layer onto the backing, and then disposing the lining along the diffusion barrier layer, for example roll bonding the lining to the plated diffusion barrier layer and backing.

As indicated above, the method includes bonding the lining to the backing with the diffusion barrier layer therebetween. The diffusion barrier layer can be disposed on the backing or the lining before the bonding process. Alternatively, the step of disposing the diffusion barrier layer between the lining and the backing is during the bonding process. An example bonding process includes roll bonding or rolling either the lining or the backing onto the diffusion barrier layer. The bonding can be referred to as hot bonding, where the bearing is heated during the bonding step, or cold bonding, where the bearing is not heated.

The method further includes heating the bearing after the bonding step, for example at a temperature of at least 400° C. The heating step can include forming the particles including silicon in the lining.

The method also includes forming or shaping the lining, backing, and diffusion barrier layer of the bearing into a desired shape, for example the shape described above which extends circumferentially around the center axis. The forming or shaping step can occur before or after the heating or heat treating step.

According to one preferred embodiment, the method first includes producing or otherwise obtaining the backing in the form of a steel strip, producing or otherwise obtaining the lining in the form of an aluminum strip, and producing or otherwise obtaining the diffusion barrier layer in the form of a nickel strip. Next, the method includes cladding the lining with the diffusion barrier layer or plating the backing with the diffusion barrier layer. After the cladding or plating step, the method includes bonding the lining to the backing with the diffusion barrier layer between the backing and the lining. After the bonding step, the method includes heat treating the lining by heating the entire bearing to a temperature of at least 400° C. The method further includes forming the bearing into a shape, for example the shape described above wherein the bonded backing, the lining, and diffusion barrier layer extend extends circumferentially around the center axis. The forming step is typically conducted after the bonding step and after the heating or heat treating step. Alternatively, the forming step can be conducted before the heating or heat treating step.

Obviously, many modifications and variations of the present invention are possible in light of the above teachings and may be practiced otherwise than as specifically described while within the scope of the following claims. In particular, all features of all claims and of all embodiments can be combined with each other, as long as they do not contradict each other.

What is claimed is:

1. A bearing comprising:
   a backing formed of a steel material,
   a lining disposed along said backing, said lining being formed of aluminum or an aluminum alloy,
   a diffusion barrier layer disposed between said backing and said lining, said diffusion barrier layer being formed of nickel or a nickel alloy,
   said lining including silicon precipitates, and
   wherein aluminum intermetallic phases are not observed in a cross sectional examination of said backing, said lining, and said diffusion barrier layer at up to 500× magnification of said backing, said lining, and said diffusion barrier layer.

2. A bearing according to claim 1, wherein said aluminum intermetallic phases are iron-aluminum intermetallic phases.

3. A bearing according to claim 1, where said diffusion barrier layer is a nickel alloy.

4. A bearing according to claim 1, wherein said diffusion barrier layer is disposed directly on said backing, and said lining is disposed directly on said diffusion barrier layer.

5. A bearing according to claim 1 including a first half shell extending circumferentially around a first portion of a center axis from a first end to a second end;
   a second half shell extending circumferentially around a second portion of said center axis from a third end to a fourth end, said third end of said second half shell being joined to said first end of said first half shell, and said fourth end of said second half shell being joined to said second end of said first half shell;
   said half shells each including said backing, said diffusion barrier layer, and said lining.

* * * * *